(12) United States Patent
Finkenzeller et al.

(10) Patent No.: US 11,341,391 B2
(45) Date of Patent: May 24, 2022

(54) DATA CARRIER HAVING TWO OSCILLATING CIRCUITS

(71) Applicant: GIESECKE+DEVRIENT MOBILE SECURITY GMBH, Munich (DE)

(72) Inventors: Klaus Finkenzeller, Unterfohring (DE); Stefan Kluge, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/316,147

(22) PCT Filed: Jul. 10, 2017

(86) PCT No.: PCT/EP2017/000814
§ 371 (c)(1),
(2) Date: Jan. 8, 2019

(87) PCT Pub. No.: WO2018/007014
PCT Pub. Date: Jan. 11, 2018

(65) Prior Publication Data
US 2019/0213460 A1      Jul. 11, 2019

(30) Foreign Application Priority Data

Jul. 8, 2016     (DE) .................... 10 2016 008 357.3
Jun. 23, 2017   (DE) .................... 10 2017 005 934.9

(51) Int. Cl.
*G06K 19/06* (2006.01)
*G06K 19/077* (2006.01)
*G06K 19/07* (2006.01)

(52) U.S. Cl.
CPC ... *G06K 19/07773* (2013.01); *G06K 19/0726* (2013.01)

(58) Field of Classification Search
CPC ... G06K 19/00; G06K 19/06046; G06K 19/07
(Continued)

(56) References Cited

U.S. PATENT DOCUMENTS 4,600,829 A    7/1986  Walton
5,198,647 A    3/1993  Mizuta
(Continued)

FOREIGN PATENT DOCUMENTS

CN    101809816 A    8/2010
CN    102906766 A    1/2013
(Continued)

OTHER PUBLICATIONS

International Search Report from PCT Application No. PCT/EP2017/000814, dated Sep. 20, 2017.
(Continued)

*Primary Examiner* — Daniel St. Cyr
(74) *Attorney, Agent, or Firm* — Workman Nydegger

(57) ABSTRACT

A portable data carrier comprises a first electrical oscillating circuit, which includes a first antenna coil and a first electrical load, and at least one second electrical oscillating circuit, which comprises a second antenna coil and a second electrical load. The first antenna coil and the second antenna coil are geometrically arranged relative to each other such that there is no mutual inductance between the first antenna coil and the second antenna coil.

11 Claims, 11 Drawing Sheets

(58) Field of Classification Search
USPC .................. 235/492, 487, 462.46, 472.02
See application file for complete search history.

(56) References Cited

U.S. PATENT DOCUMENTS

| | | | |
|---|---|---|---|
| 5,585,617 A * | 12/1996 | Ohbuchi | G06K 19/0724 |
| | | | 235/491 |
| 6,223,990 B1 * | 5/2001 | Kamei | G06K 7/0008 |
| | | | 235/451 |
| 6,640,090 B1 | 10/2003 | Kitahara et al. | |
| 8,297,516 B2 | 10/2012 | Fukushima et al. | |
| 8,540,162 B2 * | 9/2013 | Le Garrec | G06K 7/10178 |
| | | | 235/492 |
| 9,189,725 B2 | 11/2015 | Blot et al. | |
| 9,262,654 B2 | 2/2016 | Finkenzeller | |
| 9,390,603 B2 | 7/2016 | Li et al. | |
| 10,387,760 B2 | 8/2019 | Wu | |
| 2004/0069856 A1 | 4/2004 | Held et al. | |
| 2010/0230501 A1 | 9/2010 | Fukushima et al. | |
| 2011/0043431 A1 * | 2/2011 | Reinhold | H01Q 7/00 |
| | | | 343/867 |
| 2012/0074233 A1 * | 3/2012 | Finn | G06K 19/077 |
| | | | 235/492 |
| 2012/0241524 A1 | 9/2012 | Blot et al. | |
| 2014/0055247 A1 | 2/2014 | Kinkenzeller | |
| 2014/0225791 A1 * | 8/2014 | Baldischweiler | G06K 7/0095 |
| | | | 343/703 |
| 2016/0086465 A1 | 3/2016 | Li et al. | |
| 2016/0282461 A1 * | 9/2016 | Reniers | A61B 90/98 |
| 2016/0314390 A1 | 10/2016 | Wu | |

FOREIGN PATENT DOCUMENTS

| | | |
|---|---|---|
| CN | 103699929 A | 4/2014 |
| CN | 105447556 A | 3/2016 |
| DE | 10141217 A1 | 3/2003 |
| DE | 10258670 A1 | 6/2004 |
| DE | 102007019672 A1 | 8/2008 |
| DE | 102011012230 A1 | 8/2012 |
| DE | 102011100296 A1 | 11/2012 |
| DE | 102012025419 A1 | 6/2014 |

OTHER PUBLICATIONS

German Search Report from DE Application No. 102016008357.3, dated May 11, 2017.
German Search Report from DE Application No. 102017005934.9, dated Apr. 4, 2018.
Office Action from corresponding Chinese Application No. 201780039043.2, dated Apr. 9, 2021.

* cited by examiner

DATA CARRIER HAVING TWO OSCILLATING CIRCUITS

BACKGROUND

The present invention relates to a portable data carrier having two antenna coils formed as an oscillating circuit.

From the prior art RFID transponders are known which have two antenna coils, wherein their coil axes are arranged at an angle of 90 degrees, see e.g. U.S. Pat. No. 6,640,090. Further, contactless cards having two galvanically isolated antenna coils are known from the prior art, wherein an antenna coil is connected to a light-emitting diode to supply the light-emitting diode with electrical energy, and the other coil is connected to an RFID chip to supply the chip with energy and to communicate with this. The second antenna coil is ordinarily arranged within the first antenna coil in the card body.

A problem of contactless cards having two antenna coils is that the coils, on the one hand, form an electrical oscillating circuit with the respectively attached structural element, e.g. a chip in the first antenna coil and a light-emitting diode in the second antenna coil, on the other hand, said coils are magnetically coupled with each other by a high-frequency magnetic field flowing jointly through both antenna coils, for example with a frequency of 13.56 MHz. Due to the magnetic coupling between the two antenna coils, the two oscillating circuits influence each other in an unwanted, negative manner. Thus the quality factor of the oscillating circuit having the light-emitting diode is reduced, e.g. by a shunt regulator of the chip, which leads to an unwanted worsening of the responsitivity of the light-emitting diode. The oscillating circuit having the light-emitting diode conversely damps the oscillating circuit having the chip and reduced its quality factor, which leads to a poorer responsitivity of the chip as well as to a poorer transfer of a load modulation. The non-linear current flow through the light-emitting diode induces a non-linearly running voltage in the oscillating circuit having the chip, which can lead to interruptions in a communication between the chip and an external terminal.

SUMMARY

It is therefore an object of the present invention to make an arrangement of the antenna coils in the portable data carrier available which avoids a mutual influencing of the oscillating circuits.

The object is solved by a portable data carrier, comprising a first electrical oscillating circuit, which comprises a first antenna coil and a first electrical load, and at least one second electrical oscillating circuit, which comprises a second antenna coil and a second electrical load. The first antenna coil and the second antenna coil are according to the invention geometrically arranged to each other such that no mutual inductance between the first antenna coil and the second antenna coil exist. This has the advantage that no mutual influencing exists between the two oscillating circuits. It is advantageous that the first load, e.g. a chip having a contactless interface, is not influenced by the second load, e.g. a light-emitting diode, and the original parameters of the data carrier, such as responsitivity, load modulation amplitude, quality factor, resonance frequency, etc., are retained unchanged. Conversely, the second oscillating circuit having the second load in the form of an e.g. light-emitting diode is no longer damped by the first load, e.g. the chip or its shunt regulator. This results in a higher quality factor of the second oscillating circuit. A higher quality factor leads to a higher induced voltage. Therefore, the second antenna coil can be reduced in its surface.

An advantageous embodiment example is that a surface integral over a first high-frequency magnetic flux generated in the first coil has the value zero in the second antenna coil, wherein the first magnetic flux is effectuated by a first current, wherein the first current flows in the first oscillating circuit. This has the advantage that the second oscillating circuit is not influenced by the first oscillating circuit.

A further advantageous embodiment example is that a surface integral over a second high-frequency magnetic flux generated in the second coil has the value zero in the first antenna coil, wherein the second magnetic flux is effectuated by a second current, wherein the second current flows in the second oscillating circuit. This has the advantage that the first oscillating circuit is not influenced by the second oscillating circuit.

In a further advantageous embodiment example a third, external coil, e.g. an external reading device, generates a high-frequency magnetic flux which flows through the first and the second coil, wherein in the first and second coil respectively a high-frequency voltage is induced, which effectuates respectively a high-frequency current, which in turn generates each a high-frequency magnetic flux, wherein a surface integral over a high-frequency magnetic flux generated respectively in one coil has the value zero in the respectively other antenna coil. This has the advantage that the first and the second oscillating circuit, while being supplied with energy by means of the third, external coil, do not mutually influence each other, however.

A further advantageous embodiment example is that the first antenna coil and the second antenna coil are arranged in a common plane or in a different plane of the data carrier. This has the advantage that if the two antenna coils are arranged in different planes, then both antenna coils can mutually overlap such that no mutual inductance exists between the coils. Alternatively, the two antenna coils can be arranged in a common plane, so that, while they do not mutually overlap, nevertheless no mutual inductance exists, however.

A further advantageous embodiment example is that a first coil axis of the first antenna coil is arranged parallel or at an angle of 90 degrees to a second coil axis of the second antenna coil. In principle, the coils or their coil axes can be arranged at an arbitrary angle to each other if the coils are geometrically arranged to each other such that a surface integral over a magnetic flux, which penetrates a coil, has the value zero, wherein the magnetic flux is generated by a current in the respectively other coil.

A further advantageous embodiment example is that a ferrite core is arranged in the first and/or the second antenna coil. It is advantageous that by means of the ferrite core an inductance of the first and/or second antenna coil can be increased to compensate for, for example, a small cross-sectional area of the antenna coil.

A further advantageous embodiment example is that the first electrical load is a first chip and/or a first light-emitting diode. Advantageously, any suitable electronic device can be employed as an electrical load, such as e.g. also a display for representing data, and that the second electrical load is a chip and/or a light-emitting diode, wherein any suitable electronic device can be employed as a load.

A further advantageous embodiment example is that the first chip and the second chip have an interface for a contactless communication and at least one interface for a contact-type communication with an external device, wherein a contact-type or contactless communication with external devices is possible, such as e.g. readers or terminals, etc., to exchange data with these.

BRIEF DESCRIPTION OF THE DRAWINGS

Further features and advantages of the invention will result from the following description of embodiments according to the invention as well as further alternative embodiments in connection with the drawing, which shows.

DETAILED DESCRIPTION OF VARIOUS EMBODIMENTS

Figure 1:
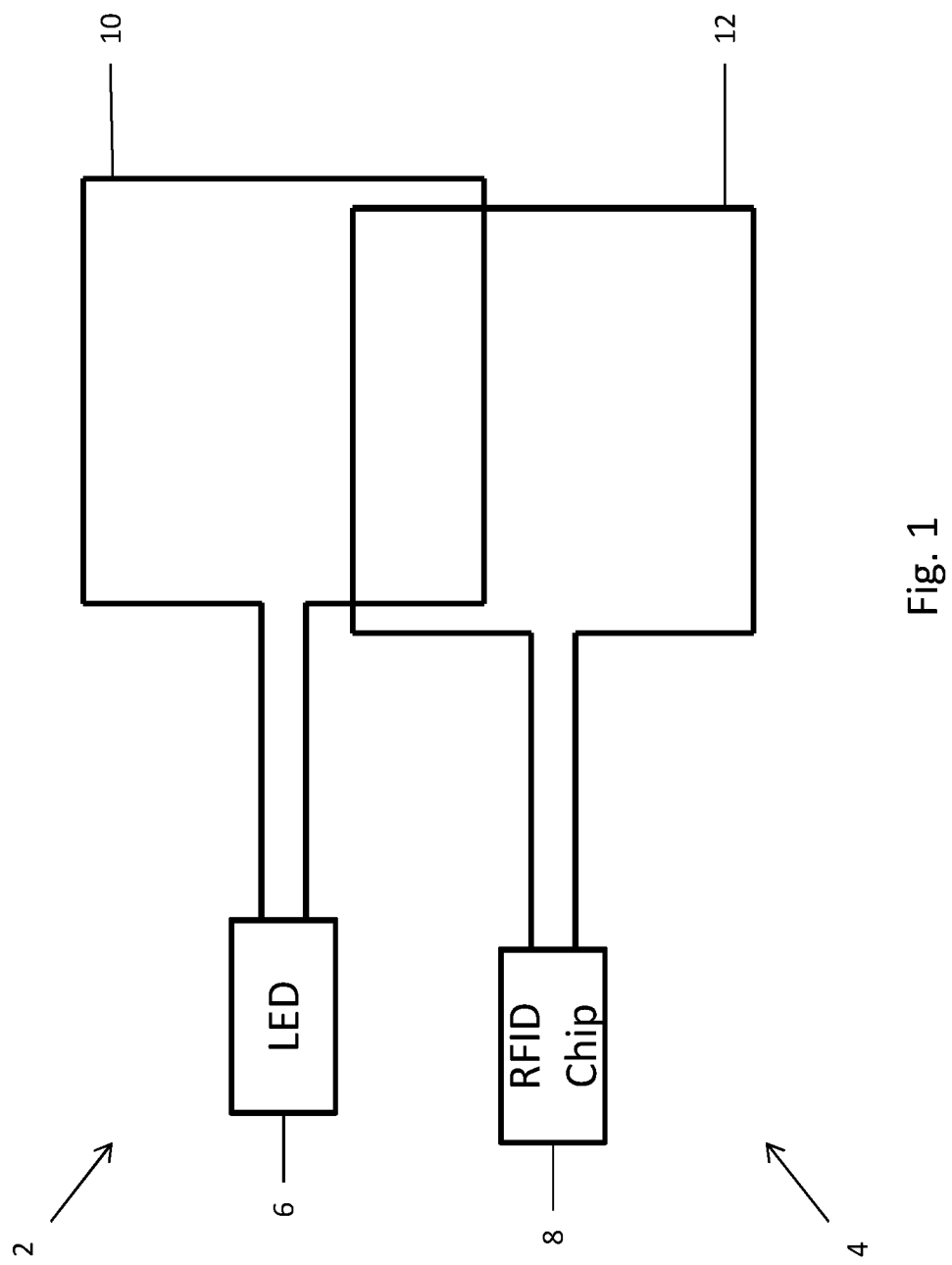
FIG. 1 a basic arrangement of two oscillating circuits, wherein the antenna coils mutually overlap according to the invention, FIG. 2 an embodiment example according to the invention on a portable data carrier in the ID1 format having two oscillating circuits, wherein the antenna coils mutually overlap according to the invention, FIG. 3 an embodiment example according to the invention in which the coil axes enclose an angle of 90 degrees, FIGS. 4 to 11, which show different embodiment examples according to the invention for possible geometries of antenna coils and their overlap.

FIG. 1 shows the basic arrangement of two oscillating circuits 2 and 4. A first oscillating circuit 2 comprises as the first electrical load 6, for example a light-emitting diode, abbreviated as LED. The LED 6 is conductively connected to a first antenna coil 10 to the first oscillating circuit 2. The second oscillating circuit 4 comprises as the second load 8 e.g. an RFID chip. The RFID chip 8 is conductively connected to the second antenna coil 12. According to the invention, the first antenna coil 10 and the second antenna coil 12 are geometrically arranged to each other such that no mutual inductance between the first antenna coil 10 and the second antenna coil 12 exists. This is attained by having the two antenna coils 10 and 12 mutually overlap. The overlap is chosen such that an integral over a magnetic flux Φ within the area of the chosen antenna coil yields the value zero. For this, the following formula holds, here e.g. applied to the second antenna coil 12:

$$M_{10\_12} = \frac{\Phi A_{10}}{I_{12}} = \int_{A_{10}} \frac{B_{10}}{I_{12}} dA_{10} = 0$$

In this connection, $\Phi_{A10}$ is the magnetic flux through the area of the antenna coil 10 with $\Phi = B*A$, triggered by a current 112 through the antenna coil 12.

B is also designated as the magnetic flux density, from the product of flux density and area there results the magnetic flux 1 for the total magnetomotive force of the coil. $M_{10\_12}$ is the mutual inductance between the coils 10 and 12.

The skilled person recognizes that instead of an LED 6 and an RFID chip 8, for example also two mutually independently communicating chips can be realized on a data carrier. Further, all other suitable electronic devices can be employed as the first and second load, such as chips having a contactless and/or contact-type interface, display elements, etc.

It is advantageous in the invention that the chip 8 is not influenced by the LED 6, and the original parameters, such as responsitivity, load modulation amplitude, quality factor, resonance frequency, etc., are retained unchanged. Conversely, the oscillating circuit 2 having the LED 6 is not influenced or damped by the chip 8, in particular its shunt regulator, resulting in a consistently higher quality factor of the oscillating circuit 2. This leads to a higher induced voltage, which is why the antenna coil 10 of the LED 6 can be reduced in their area.

Figure 2:
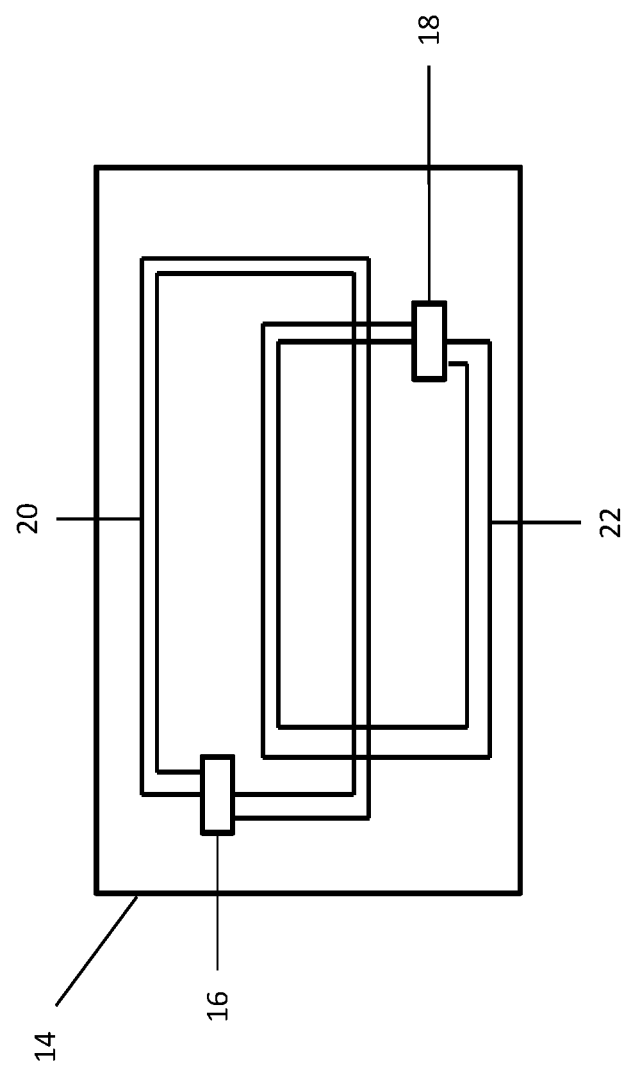

FIG. 2 shows an embodiment example according to the invention on a portable data carrier 14 in the ID1 format having two oscillating circuits, wherein a first antenna coil 20 and a second antenna coil 22 mutually overlap according to the invention. The first antenna coil 20 is connected to a chip 16 and forms with this a first oscillating circuit. The second antenna coil 22 is connected to a light-emitting diode 18 and forms a second oscillating circuit. The antenna coils 20 and 22 mutually overlap according to the invention, so that no influencing occurs between the first and second oscillating circuit. In the represented example, the antenna coils 20 and 22 are arranged in different planes of the data carrier 14.

Figure 3:
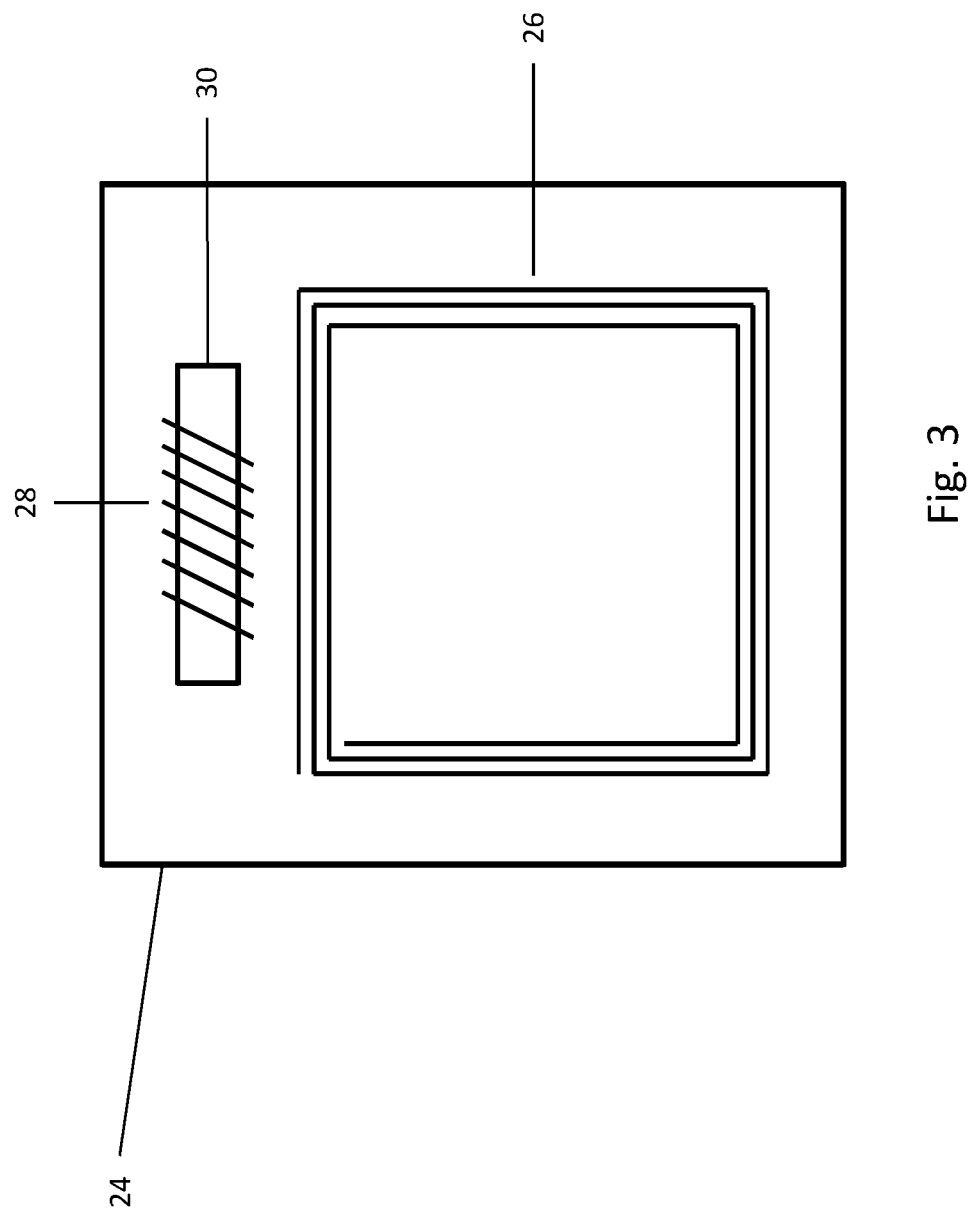
Figure 4:
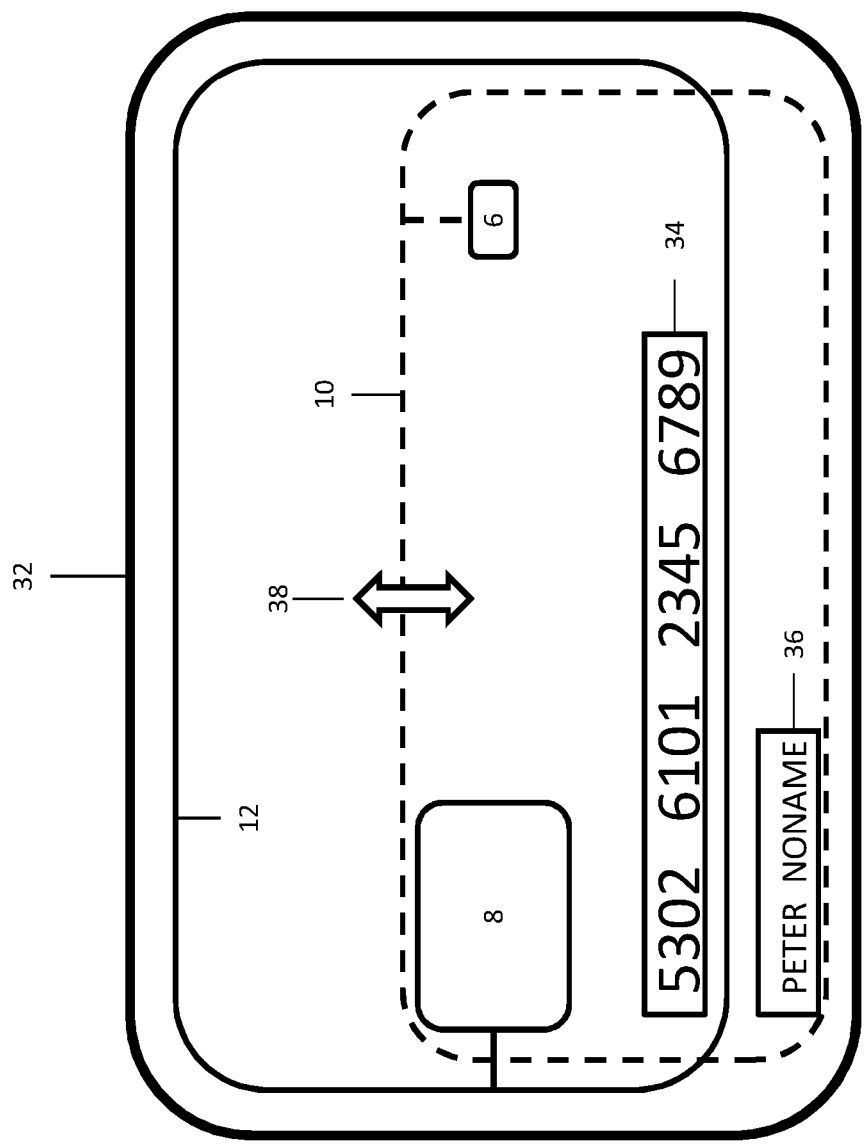
Figure 5:
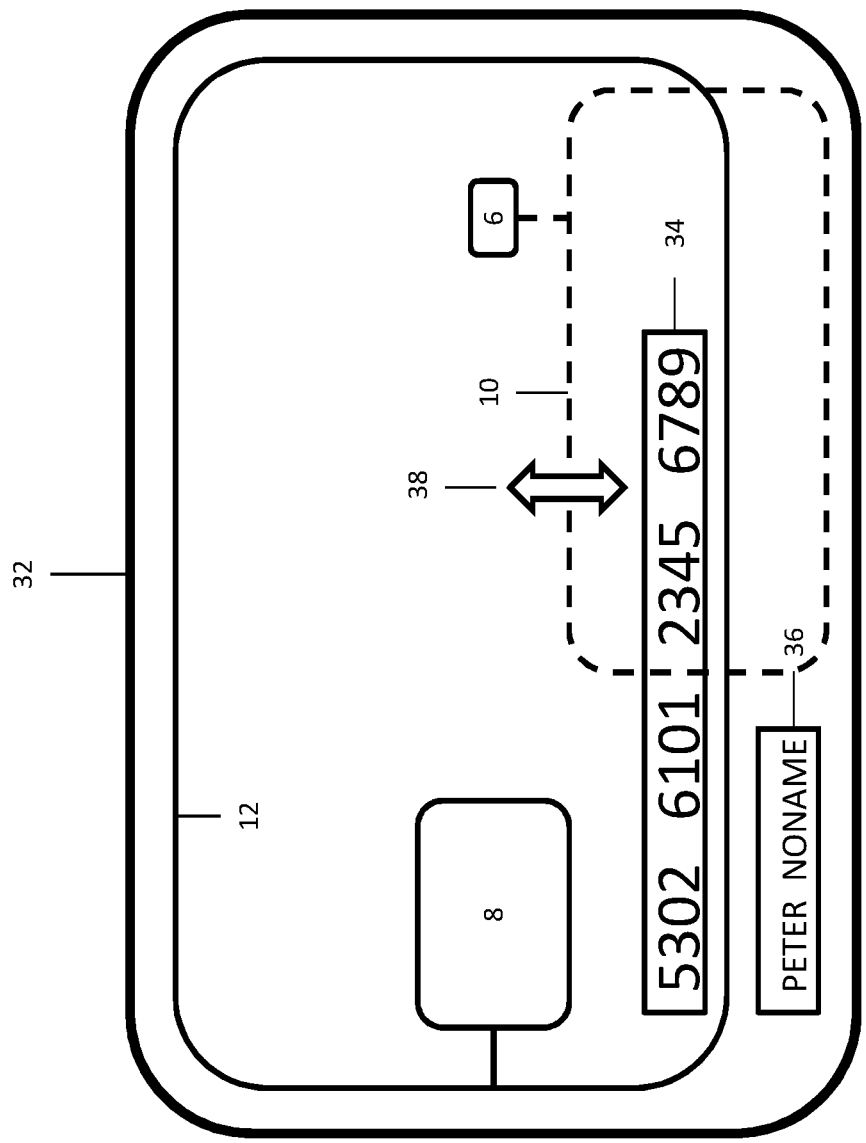
Figure 6:
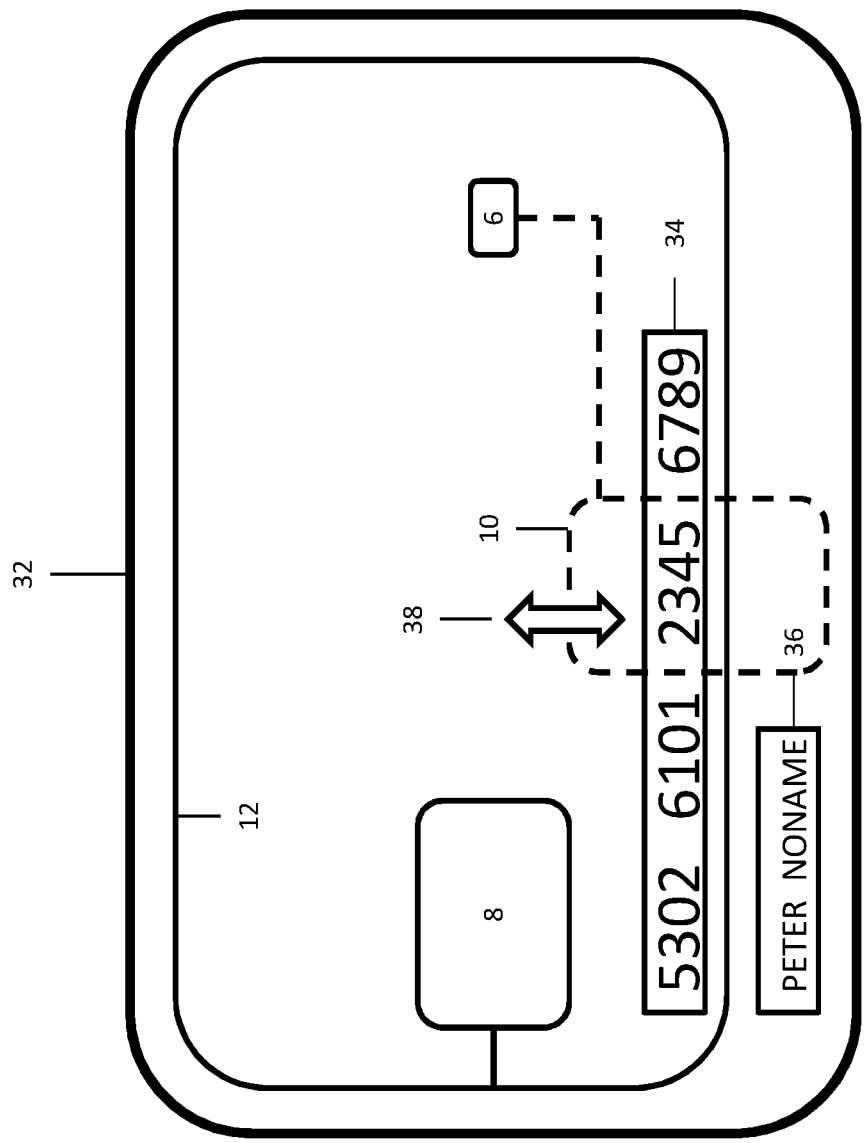
Figure 7:
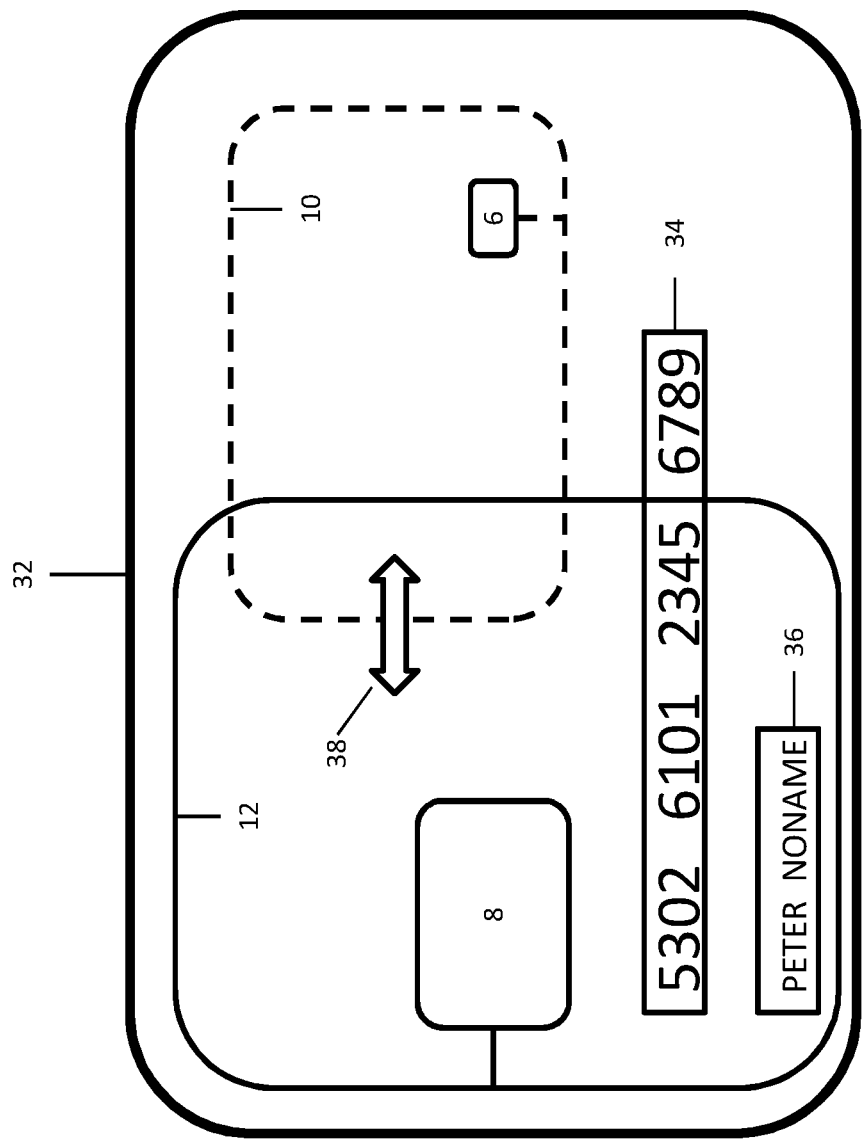
Figure 8:
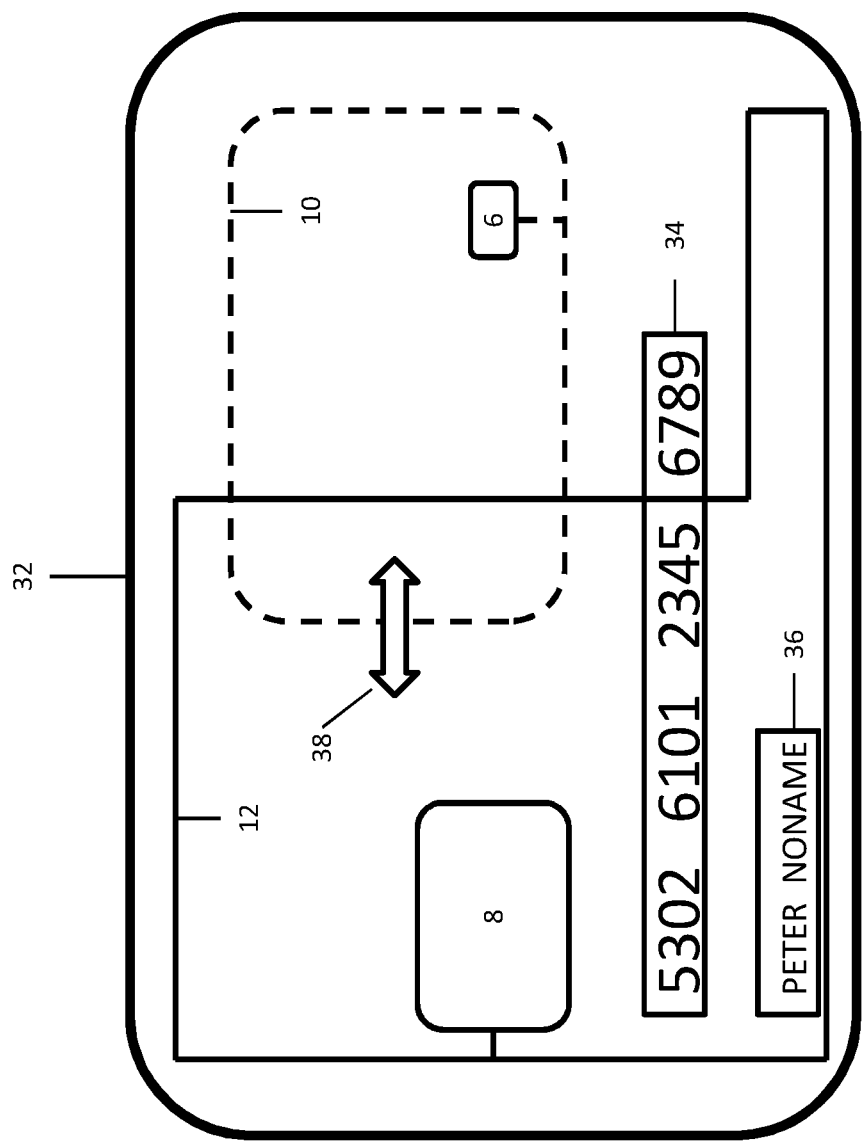
Figure 9:
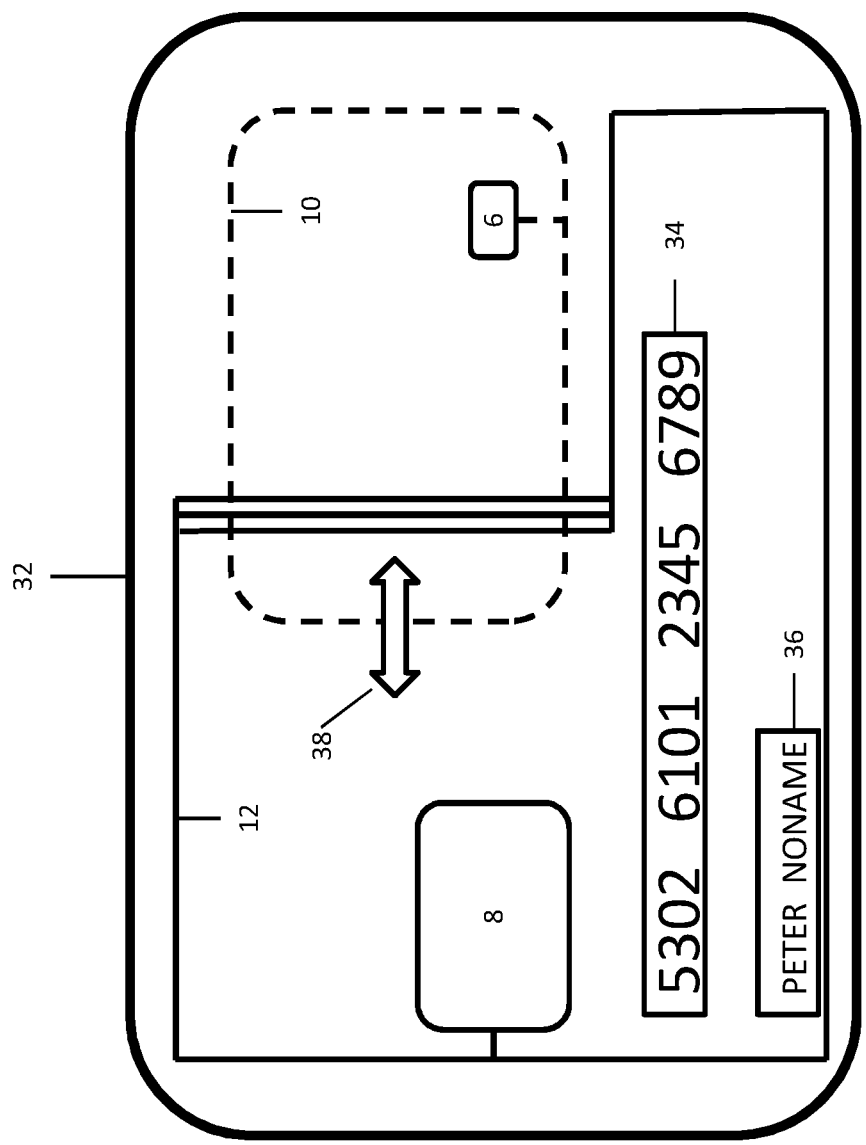
Figure 10:
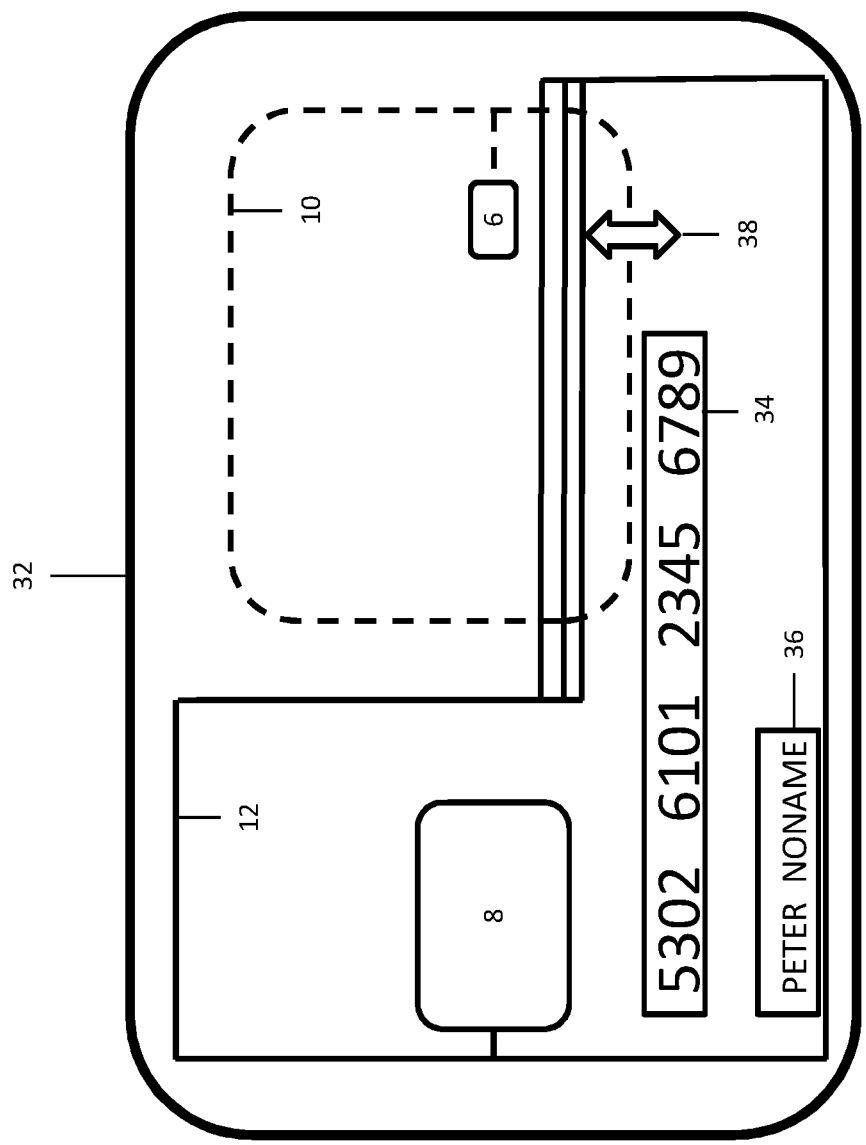
Figure 11:
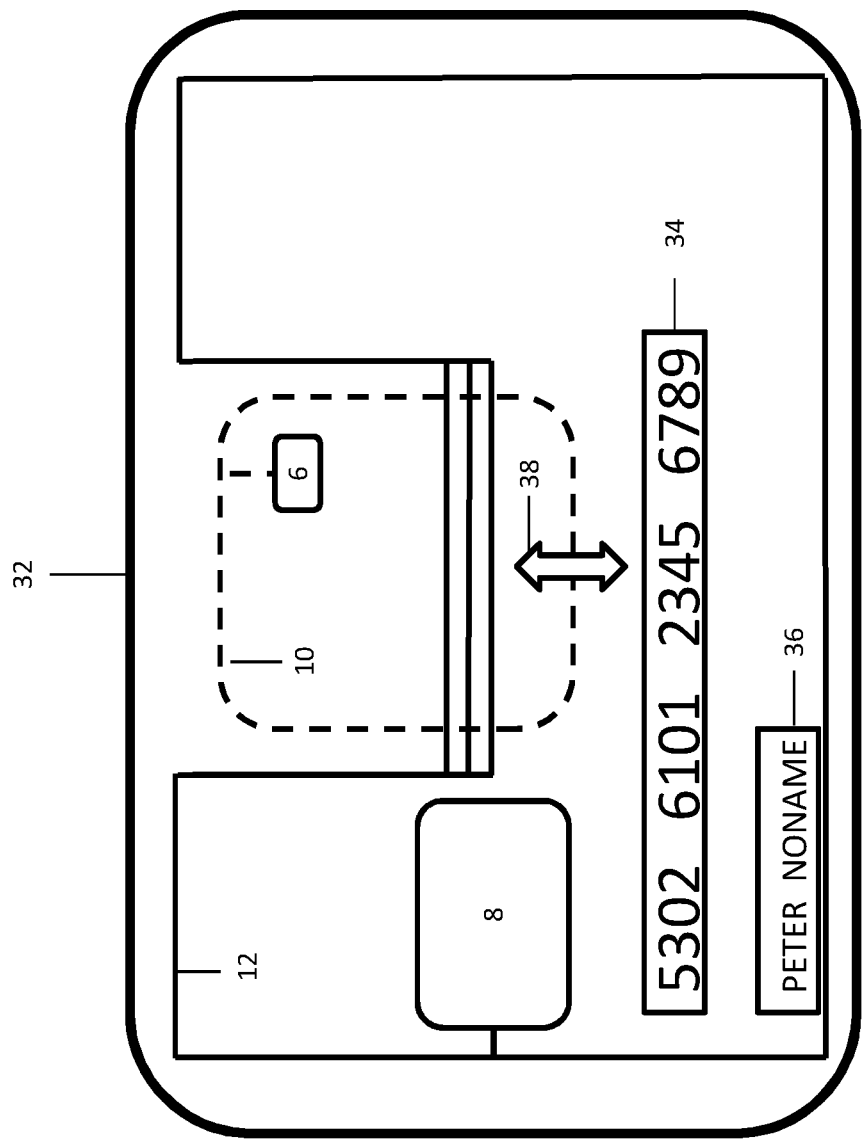

FIG. 3 shows an embodiment example according to the invention, wherein the coil axes enclose an angle of 90 degrees. Here, a data carrier 24 has a first antenna coil 26 and a second antenna coil 28, wherein all other structural elements, such as e.g. the first and second load, were omitted for reasons of simplicity of the representation. The two antenna coils 26 and 28 or their coil axes enclose an angle of 90 degrees. This is an alternative to the above-described overlap of the antenna coils to avoid a mutual influencing of the two antenna coils 26 and 28 or the respectively interrelated oscillating circuits. Additionally, the second antenna coil 28 is arranged on a ferrite core 30 to increase the inductance of the second antenna coil 28.

FIGS. 4 to 11 show different embodiment examples according to the invention for possible exemplary geometries of antenna coils 10 and 12 and their overlap in order that the integral over a magnetic flux in the area enclosed by the second antenna coil 12 becomes zero.

For example a credit card serves as a portable data carrier 32. On the credit card 32, a credit card number 34 and a name of an owner of the credit card 32 are high-embossed. In the credit card 32, an LED 6 is arranged which is supplied with energy via the first antenna coil 10. Further, an RFIC chip 8, which is supplied with energy via the second antenna coil 12, is located on the credit card 32. An arrow indicates a direction 38 in which the first antenna coil 10 can be changed, in order that an overlap with the second antenna coil 12 is chosen or adjusted such that an integral over a magnetic flux in the area enclosed by the second antenna coil 12 becomes zero. Preferably the antenna coils 10 and 12 are installed such that they are not affected by the high-embossing in the regions 34 and 36.

LIST OF REFERENCE SIGNS 2 a first electrical oscillating circuit
4 a second electrical oscillating circuit
6 a first load, e.g. an LED
8 a second load, e.g. an RFID chip
10 a first antenna coil
12 a second antenna coil
14 a portable data carrier
16 a chip
18 LED
20 a first antenna coil
22 a second antenna coil
24 a portable data carrier
26 a first antenna coil 28 a second antenna coil
30 a ferrite core
32 a portable data carrier, e.g. a credit card
34 a high-embossed credit card number
36 a high-embossed name of the owner of the credit card
38 direction in which the first antenna coil is changed according to the invention, so that upon suitable mutual overlap of the first and second antenna coil, the integral over the magnetic flux in the second antenna coil becomes zero

The invention claimed is:

1. A portable data carrier, comprising:
a first electrical oscillating circuit which comprises a first antenna coil and a first electrical load;
at least a second electrical oscillating circuit which comprises a second antenna coil and a second electrical load;
wherein the first antenna coil and the second antenna coil are geometrically arranged to each other such that the first antenna coil and the second antenna coil mutually overlap and such that a mutual inductance between the first antenna coil and the second antenna coil is canceled; and
wherein a first coil axis of the first antenna coil is arranged at an angle of 90 degrees to a second coil axis of the second antenna coil.

2. The data carrier according to claim 1, wherein a surface integral over a first high-frequency magnetic flux generated in the first antenna coil has the value zero in the second antenna coil;
wherein the first magnetic flux is effectuated by a first current;
wherein the first current flows in the first oscillating circuit.

3. The data carrier according to claim 1, wherein a surface integral over a high-frequency magnetic flux generated in the second antenna coil has the value zero in the first antenna coil;
wherein the second magnetic flux is effectuated by a second current;
wherein the second current flows in the second oscillating circuit.

4. The data carrier according to claim 1, wherein a third, external coil generates a high-frequency magnetic flux which flows through the first and the second antenna coil;
wherein in the first and second antenna coil respectively a high-frequency voltage is induced, which effectuates respectively a high-frequency current in the first and second antenna coil, which in turn generates each a high-frequency magnetic flux;
wherein a surface integral over a high-frequency magnetic flux generated in the first second antenna coil has the value zero in second antenna coil or a surface integral over a high-frequency magnetic flux generated in the second antenna coil has the value zero in first antenna coil.

5. The data carrier according to claim 1, wherein the first antenna coil lies on a first plane and the second antenna coil lies on a second plane;
wherein the first and the second plane enclose an angle;
wherein the mutual inductance is canceled if the second antenna coil is geometrically arranged such that a surface integral over the magnetic flux, which is effectuated by the first current in the first antenna coil and which penetrates the second antenna coil, is zero, or a surface integral over the magnetic flux, which is effectuated by the second current in the second antenna coil and which penetrates the first antenna coil, is zero.

6. The data carrier according to claim 1, wherein a ferrite core is arranged in the first and/or the second antenna coil.

7. The data carrier according to claim 1, wherein the first electrical load is a first chip and/or a first light-emitting diode.

8. The data carrier according to claim 1, wherein the second electrical load is a second chip and/or a second light-emitting diode.

9. The data carrier according to claim 1, wherein the first chip and/or the second chip has an interface for a contact-type communication and/or an interface for a contactless communication with an external device.

10. A portable data carrier, comprising:
a first electrical oscillating circuit which comprises a first antenna coil and a first electrical load;
at least a second electrical oscillating circuit which comprises a second antenna coil and a second electrical load;
wherein the first antenna coil and the second antenna coil are geometrically arranged to each other such that the first antenna coil and the second antenna coil mutually overlap and such that a mutual inductance between the first antenna coil and the second antenna coil is canceled;
wherein the first electrical load is a first chip; and
wherein the second electrical load is a second light-emitting diode.

11. A portable data carrier, comprising:
a first electrical oscillating circuit which comprises a first antenna coil and a first electrical load;
at least a second electrical oscillating circuit which comprises a second antenna coil and a second electrical load;
wherein the first antenna coil and the second antenna coil are geometrically arranged to each other such that a mutual inductance between the first antenna coil and the second antenna coil is canceled; and
wherein a distance between the first antenna coil and the second antenna coil consists of the data carrier body.

* * * * *